June 4, 1946.  B. E. LUBOSHEZ  2,401,692
COINCIDENCE RANGE FINDER
Filed July 18, 1941  2 Sheets-Sheet 1
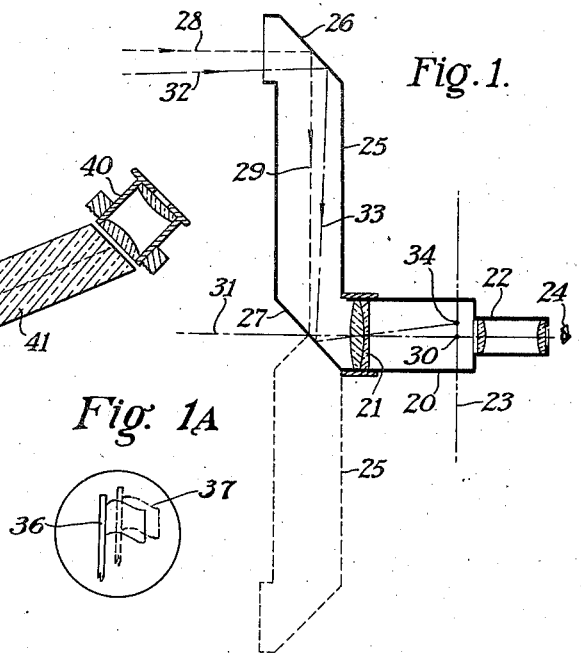
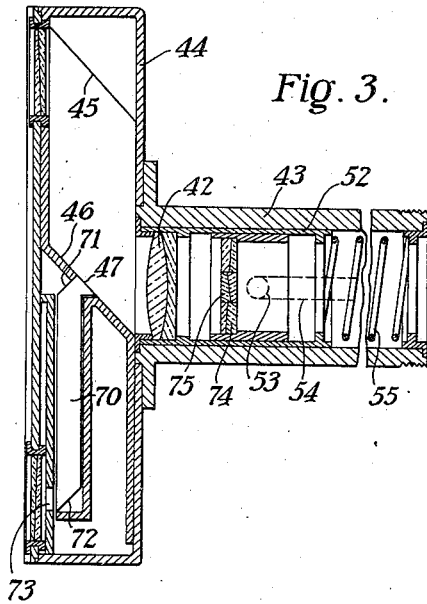
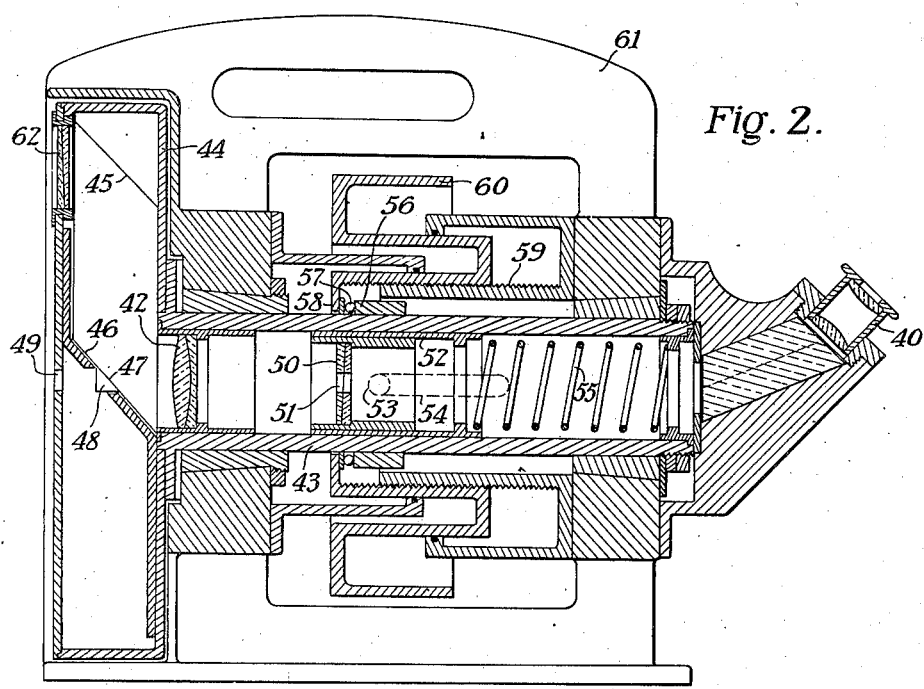
Benjamin E. Luboshez
INVENTOR
BY
ATTORNEY June 4, 1946.  B. E. LUBOSHEZ  2,401,692
COINCIDENCE RANGE FINDER
Filed July 18, 1941  2 Sheets-Sheet 2

Benjamin E. Luboshez
INVENTOR

BY *(signature)*

ATTORNEY

Patented June 4, 1946

2,401,692

UNITED STATES PATENT OFFICE 2,401,692

COINCIDENCE RANGE FINDER

Benjamin E. Luboshez, Rochester, N. Y., assignor to Eastman Kodak Company, Rochester, N. Y., a corporation of New Jersey Application July 18, 1941, Serial No. 402,986

6 Claims. (Cl. 88—2.7)

This invention relates to range finders and particularly to a modification of the moving viewpoint type of range finder described in my copending application, Serial No. 402,982, filed concurrently herewith. The present invention is also useful with the forms of moving viewpoint range finders described in my other applications also filed concurrently herewith, Serial Nos. 402,- 983, 402,984 and 402,985.

The present invention is a combination of a moving viewpoint range finder and a coincident type range finder. One embodiment of it is a combination of both of these types of range finders and a stereo range finder.

It is an object of the invention to provide a method and means for rapidly and accurately finding the range of an object. It is a particular object of the invention to provide an instrument which can be used for finding the range of objects which do not have sharp lines as required for ordinary coincident type range finders. On the other hand, it is an object of the invention to provide a method of range finding in which approximate adjustment can be rapidly reached and the final critical adjustment be made accurately.

According to the invention a moving viewpoint range finder is provided with two viewpoints giving superimposed images in the focus plane of the eyepiece. The light deviating means used for control of the image motion as described in my copending applications is also arranged so that even when the viewpoints are stationary this light deviating means can be used for bringing the two images into coincidence. The images are first brought into coincidence to give the approximate range and then the viewpoint of at least one of the images is shifted along a repetitive path, for example, rotated. If the images were in perfect coincidence, there would be no apparent shift of the images. However, if perfect coincidence is not obtained, the residual image motion can be eliminated by adjusting the light deviating means more accurately. Thus this method provides rapid operation into approximately correct adjustment and then accurate operation to get the final critical adjustment.

Another object of this invention is to provide reference frames against which the movement of the image of the target can be observed, such relative movements being independent of accidental movement or vibration of the whole instrument.

The invention will be fully understood from the following description when read in connection with the accompanying drawings in which:

Fig. 1 illustrates the principle of moving viewpoint range finders.

Fig. 1A shows the field view as seen through the instrument.

Fig. 2 shows one embodiment of the invention.

Fig. 3 shows a different embodiment of the invention.

Figure 4:
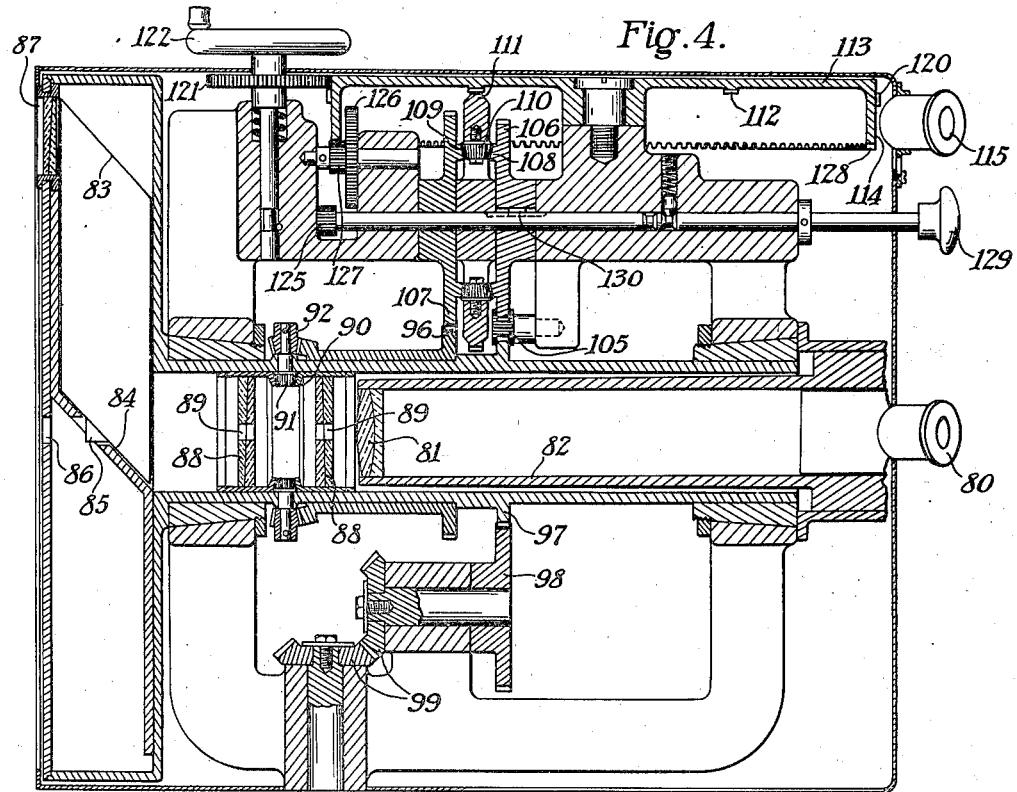
Fig. 4 shows still a third embodiment of the invention.

In Fig. 1 a range finder having a housing 20 is provided with an objective 21 for forming in its focus plane an image of the object whose range is to be found. The eye 24 of an observer views this image through an eyepiece 22. On the front of the housing 20 is mounted a rotating arm 25 having reflecting surfaces 26 and 27 oriented to receive light from the object and to transmit it to the objective 21. Considering only objects on the rotation axis 31 of the system, which coincides partly with the optic axis of the objective 21, those at infinity submit rays 28 and 29 to form an image at the point 30 on this optic axis. Those at a nearer range submit rays 32 and 33 to form an image 34 to one side of this optic axis. As the rotating arm 25 is rotated, the image 34 moves circularly about the optic axis 31. All other points on the object, at this nearer range, i. e., those points not on the rotation axis, also move with a circular motion, but the image as a whole remains inverted in the image plane 23. Proper adjustment of either the mirror 26 or the mirror 27 or adjustment of variable wedge or other light deviating means can be made to bring the image 34 down to the axis 31 at which time there will be no motion of the image 34 when the rotating arm 25 is rotated.

In Fig. 1A is shown the field of view when ranging an object, for example, a flag. In this field is seen a fixed image shown by broken lines 37, such for example that formed by light through the aperture 49 of Fig. 2 described below. When the instrument is operated, an image 36 rotates about this fixed image 37, without changing its orientation, until the instrument is adjusted to eliminate this rotary motion.

In Fig. 2 the eyepiece 40 behind an erecting prism 41 views the image formed by an objective 42 mounted for rotation within a rotating tube 43 carrying a rotor 44. The main viewpoint of the objective 42 is provided by a reflector 45 and a reflector 46 formed in a single prism. A central aperture 47 in the reflector 46 is arranged by means of a wedge section of a cylinder 48 cemented thereto, to view the object directly through an aperture 49 in the rotor 44. Light reflected by the reflectors 45 and 46 on passing through the objective 42 are deviated by an adjustable prism 50, whereas light through the central aperture 47 passes directly through an aperture 51 in this prism 50. In practice the objective 42 and the prism 50 must both be as close as possible to the reflecting surface 46 or some additional means must be provided for preventing the reflected light passing through the aperture 51 and the axial light passing through the prism 50. The prism 50 is adjusted axially in this embodiment and is carried by a sleeve 52 sliding in the rotating tube 43; this sleeve 52 is fastened by a pin 53 through a slot 54 in the tube 43 to a collar 56 which rotates with the tube 43. The collar 56 and sleeve 52 are adjusted against the pressure of a spring 55 by a ball race 57 engaged by a control member 58 which is screwed onto the frame 61 of the instrument by screw threads 59. The control member 58 carries a scale 60 for indicating the adjustment in terms of the range of the object. For presetting the scale and compensating for the residual effect of the prism 50 at the infinity setting, an adjustable prism 62 is provided in front of the reflecting surface 45.

In operation, the instrument is pointed at the object whose range is to be found and the prism 50 is adjusted axially until the two images seen from the two viewpoints are approximately in coincidence. Then the rotor 44 is rotated which causes the reflected image to rotate unless the prism 50 is in perfect adjustment. If there is any motion apparent in the images as seen, the prism 50 is further adjusted to eliminate this motion and the range read on the scale 60.

An alternative arrangement is shown in Fig. 3 wherein an additional prism 70 is mounted in front of the central aperture 47 and has reflecting surfaces 71 and 72, the latter being behind a window 73 diametrically opposite the one transmitting light to the reflector 45. In this embodiment the adjustable prism 74, instead of having a central aperture, has its central portion 75 also arranged as a prism with the direction of deviation reversed. The operation of this arrangement is the same as for Fig. 2. It is more sensitive in that the base determined by the distance between the viewpoints is greater in Fig. 3 than in Fig. 2, but Fig. 2 is a much simpler arrangement.

In Fig. 4 the eyepiece 80 views the image formed by an objective 81 rigidly held in this case by a tube 82. Light is received through two viewpoints 86 and 87, the latter viewpoint submitting light to reflectors 83 and 84 for transmission to the objective 81. A 45° wedge section 85 of a cylinder is cemented to the axial region of the reflector 84 as in Fig. 2. The light deviating means consists of two similar wedges 88 having central apertures 89 and carried by sleeves with crown gears 90 for rotation in opposite directions when bevel pinion 91 engaging the gears 90 is rotated. The pinion 91 is carried by a pin extending through the rotating tube to a pinion 92 engaging a crown gear 95 which is free to rotate on the rotating tube but which rotates synchronously with it except when the wedges 88 are being adjusted. The rotating tube 95 carries a spur gear 96 and a similar spur gear 97 is mounted on the rotor.

This latter gear 97 is driven by gears 98, 99, and hand wheel 100. It also engages an idler 105 which is in mesh with a spur gear 106 forming part of a differential with a second spur gear 107 engaging the gear 96. These gears 106 and 107 form a differential gear and rotate in opposite directions with the same speed when the gears 96 and 97 rotate synchronously. The gears 106 and 107 by means of crown gears 108 and 109 engage pinions 110 carried in ring gear 111 to form the differential. As long as the ring gear 111 remains stationary, the necessary equal and opposite rotation of the gears 106 and 107 is assured. However, this ring gear 111 is meshed with the crown gear 112 carried on a drum 113 and as said drum 113 is rotated, the gear 111 is rotated causing differential movement between the spur gears 106 and 107 which in turn causes the gear 96 to rotate relative to the gear 97 and to adjust the wedges 88. This drum 113 carries a scale 114 which may be viewed through an auxiliary eyepiece 115. The drum is driven by a large gear 120 which engages a spur gear 121 operated by a hand wheel 122 when this hand wheel is pressed inward against a light spring pressure. The separation of the eyepieces 80 and 115 is preferably made adjustable to accommodate observers with different interocular separations.

Alternatively the drum 113 may be driven automatically by the rotation of the rotor. To do this a knob and shaft 129 are moved so that the pinion 125 on the end thereof engages a spur gear 126 attached to a gear 127 which meshes with a large crown gear 128 carried by the drum 113. Key and key way coupling 130 between the shaft and the knob 129 and the gear 106 causes the shaft to rotate when the gear 106 is rotated and this motion is transmitted to the gears 125 and 126 when the latter are in mesh. The drum 113 rotates quite slowly, relatively to the rotation of the rotor.

As before, the operation consists in first setting the wedges so that there is approximate coincidence between the images seen through the viewpoints 86 and 87 and then rotating the rotor by the hand wheel 100 to provide image shift if the adjustment is not perfect. Any shift thus noted is then eliminated and the reading taken on the scale 114 through the eyepiece 115.

Figure 5:
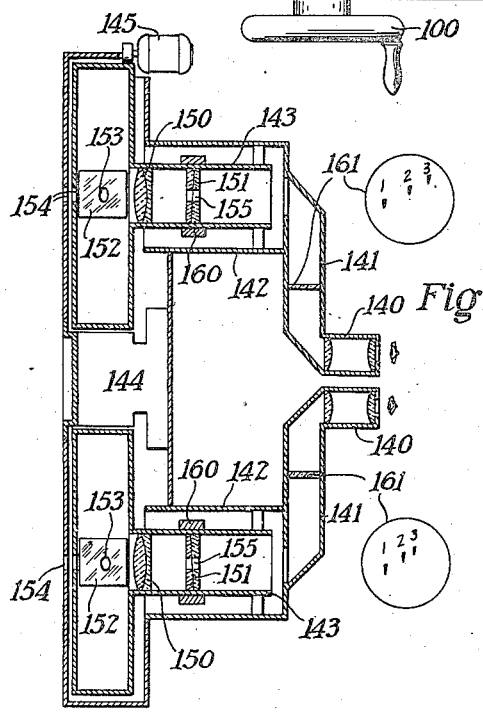
Fig. 5 shows a specific embodiment of the invention wherein stereo range finding is also combined with the coincident type and moving viewpoint type combination.

Fig. 5 shows schematically how the invention may be further combined with the stereo type of range finder. Suitable eyepieces 140 mounted in periscopes 141 are positioned at interocular separation behind the housings 142 of the two systems. In each system a rotating member 143 is supported in proper bearing and the two rotating members 143 are geared through gears 144 to rotate together. The actual gears 144 are not shown in detail since they may be either an even number or odd number of gears to provide respectively rotation in opposite directions or rotation in the same direction. Specific arrangements thereof are described in my copending application, Serial No. 402,984, mentioned above. Both rotors are driven by a friction drive engaging one of them and operated by motor 145. In each system an objective 150 forms an image of the object whose range is to be found in a focus plane of the eyepieces 140. In this horizontal cross section, only the axial reflectors 152 of the rotor are shown since the rim reflectors are above the plane of the drawings. The axial portion 153 of each reflector 152 is arranged to view the object directly through axial apertures 154 in the rotor and housing. Behind the objective is positioned an adjustable wedge 151 having a central aperture 155. The adjustment of the wedges is provided by rings 160 which may be coupled or may be operated independently, the details of this feature not being shown, since they are described in my copending applications mentioned above and may be of any of the suitable forms shown.

Thus each of the stereo pair of optical systems involves the combination of moving viewpoint and coincidence adjustment and may be used to get an approximate setting by bringing superimposed images into coincidence and to get an accurate setting by noting the adjustment for complete elimination of image motion when the rotors are rotated. According to this specific embodiment of the invention, an additional feature is provided consisting of stereoscopic graticules 161 in the focus planes of the eyepieces 140. These stereo graticules may be used in various ways.

When the two rotors 143 are geared as by an odd number of gears in the gear system 144, to rotate in the same direction and in phase with each other, the distance between the two rim viewpoints of the systems remains constant and the whole instrument can at any time be used for stereo range finding. When the object whose range is to be found does not contain any suitable sharp line, it is quite difficult to use a coincident type range finder and the stereo feature may be used for the preliminary setting.

If the rotors are geared by an even number of gears or by direct coupling, to rotate in opposite directions, the rim viewpoints of the rotors change their separation so that the image motion appears to be one in depth rather than transversely in the image plane. In this embodiment, it is preferable to take the stereo reading with the graticules when the rotors are stopped in some fixed position such as that shown in Fig. 5, in which the rim reflectors are separated by the same distance as the central viewpoints, or when they are at maximum separation, the graticules of course being ruled accordingly.

When the rotors are in motion the stereoscopic graticules form a fixed reference frame in depth against which the image instrument is observed.

Still another arrangement is possible when means are provided for distinguishing the axial viewpoints from the rim viewpoints. Such means may consist of filters over one or other set of viewpoints or a shutter for cutting off the rim viewpoints. In this arrangement, the stereo graticules can be used for taking stereo reading from the images formed by the axial viewpoints only.

This triple combination of moving viewpoint type, coincident type and stereo type range finders provides a system capable of extremely rapid and accurate range finding.

Having thus described various arrangements of my invention, I wish to point out that it is not limited to these structures but is of the scope of the appended claims.

What I claim and desire to secure by Letters Patent of the United States is:

1. The method of range finding an object from two spaced viewpoint defining means which comprises forming by an optical system and in a single image plane, images of the object from the two viewpoints, adjusting a light deviating means to bring the images into approximate coincidence, rotating at least one of the viewpoint defining means and the light deviating means about the optic axis of the image plane with respect to the system without rotating the images, adjusting the light deviating means to eliminate relative movement of the two images and noting the adjustment.

2. A combination coincident type and moving viewpoint range finder comprising a rotor having at least two entrance windows, an eyepiece whose focus plane is in optical alignment with the rotation axis of the rotor, means for receiving light through the two windows and for forming in said focus plane superposed images of the object whose range is to be found, adjustable light deviating means, rotatable synchronously with the rotor for bringing the images into coincidence and for controlling the relative movement of the images during rotation of the rotor and scale means for indicating the adjustment of the light deviating means when the images are in coincidence and said relative movement is reduced to zero.

3. A binocular range finder comprising two combination coincident-type and moving viewpoint range finders each according to claim 2, the two eyepieces being at interocular separation and also comprising stereoscopic graticules stereoscopically positioned in the two focus planes.

4. A range finder comprising a support, an eyepiece carried by the support, a rotor rotatably mounted on the front of the support, two reflectors carried approximately parallel to one another by the rotor and at an acute angle to the axis of rotation of the rotor, one reflector being in alignment with the axis and having a central aperture for admitting light from the object whose range is to be found, the other reflector being near the rim of the rotor for receiving light from the object and for reflecting it to the axis reflector, means for forming in the focus plane of the eyepiece two superposed images of the object, one by light through the central aperture and the other by light reflected by the reflectors, adjustable means coupled to rotate with the rotor for controlling the amount of relative movement of the images while the rotor rotates and scale means for indicating the adjustment of the control means when said relative movement is reduced to zero.

5. A range finder according to claim 4 in which the central aperture receives light directly from the object and said control means acts only on the light reflected by the reflectors.

6. A range finder according to claim 4 in which two additional approximately parallel reflectors are carried by the rotor at an acute angle to the axis, one in front of the central aperture and the other near the rim of the rotor diametrically opposite the first-mentioned rim reflector and said control means act equally and oppositely on the light through the central aperture and the light reflected by the reflectors defined in claim 4.

BENJAMIN E. LUBOSHEZ.